July 4, 1933.    W. R. GRISWOLD    1,916,309
INTERNAL COMBUSTION ENGINE
Filed July 8, 1930

Inventor
WALTER R. GRISWOLD
By Milton Tibbetts
Attorney

Patented July 4, 1933

1,916,309

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed July 8, 1930. Serial No. 466,459.

This invention relates to internal combustion engines and more particularly to means for controlling torsional vibration in the crank shafts of such engines.

It has for one of its objects to provide a simple and effective device to damp such torsional vibration, in which the damping effect is secured partly by mechanical friction and partly by internal molecular friction or hysteresis.

Another object of the invention is to provide a vibration damper of the character designated having mechanical friction damping devices and hysteresis damping devices which are independently actuated, the former being entirely closed and protected by the latter.

Another object of the invention is to provide a vibration damper having both mechanical friction and hysteresis damping devices assembled in a unit with a damper hub, and an inertia member readily secured to said assembly by a simple clamping operation.

A further object of the invention is to provide a vibration damper in which mechanical friction elements are mounted to float in frictional engagement with positively driven elements connected to the relatively rotatable members of the damper respectively, and are enclosed by a rubber member separately connected between said damper members.

Other objects of the invention will appear from the following description taken in connection with the drawing, which forms a part of this specification, and in which.

Figure 1:
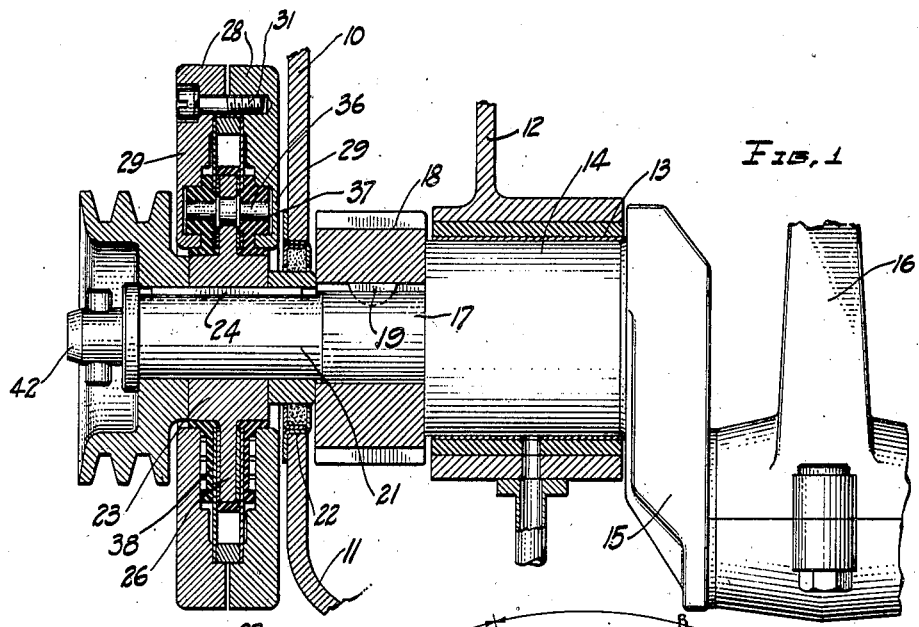
Fig. 1 is a longitudinal vertical section through part of an internal combustion engine provided with a vibration damper constructed in accordance with this invention.
Figure 2:
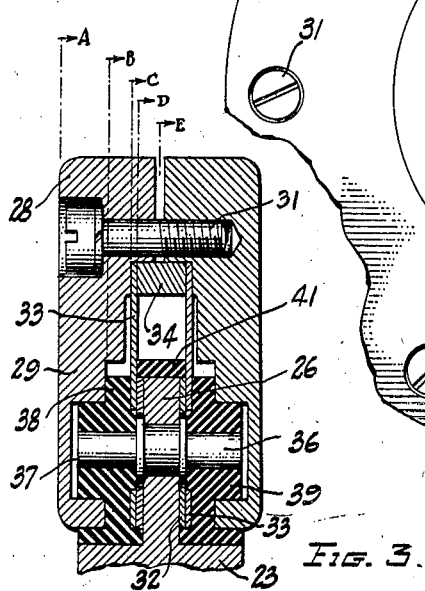
Fig. 2 is a view to a larger scale in front elevation and partially broken away in several sections, designated by the arcuate arrows A, B, C, D and E, which sections are respectively taken substantially on the corresponding lines A, B, C, D and E of Fig. 3.

Referring to the drawing, in Fig. 1 at 10 is represented the crank case of an internal combustion engine, having a lower cover or oil pan 11 and provided with transverse webs, such as shown at 12. These webs support suitable aligned bearings 13 for an engine crank shaft 14, which has the usual integral cranks 15, each of which is connected by a connecting rod 16 to a piston mounted in one of the engine cylinders. The piston and cylinder are not shown in the drawing, but are of usual construction.

Forwardly of the first bearing 13, the crank shaft 14 is preferably formed with a reduced portion 17, on which a gear or chain sprocket 18 may be keyed or otherwise secured as indicated at 19, and used to drive the engine cam shaft or other engine accessories, which are not shown in the drawing. Forwardly of the sprocket 18, the crank shaft is preferably further reduced in size as shown at 21, and projects through a suitable opening 22 in the front wall of the crank case 10.

The damping means of this invention is illustrated as mounted at or adjacent the end of the crank shaft 14. It comprises a supporting portion or hub 23, keyed or otherwise rigidly secured to the crank shaft on the reduced portion 21 thereof, as indicated at 24, which hub has a radially disposed integral flange 26. Surrounding the hub 23 and concentric with the crank shaft axis is a weight or inertia member 27, formed in two parts, each of which has a rim portion 28 and a web portion 29, these portions being removably secured together in any convenient manner as by clamp bolts 31. These members, the hub 23 and the inertia member 27, constitute the relatively movable damper members, between and to which the damping devices are connected.

The mechanical friction damping means comprises a pair of annular friction devices or disks 32 which surround the hub 23 on either side of, and in frictional contact with the side faces of the hub flange 26. These disks are also in contact with members which are connected to and share the motion of the inertia member 27 and which are shown as comprising a pair of friction plates 33, the outer ends of which are clamped between the parts of the inertia member 27. For this purpose they are separated at their periphery by a circumferential spacing member 34, substantially of the same thickness as the combined thickness of the flange 26 and the disks 32. In this way the plates are rigidly connected to the inertia member 27 and are disposed in parallel relation on either side of the flange 26. It will be evident that the friction disks 32 are thus subjected to a rubbing action caused by relative movement between the plates 33 and the flange 26, and accordingly cause mechanical friction and hence damping.

Figure 3:
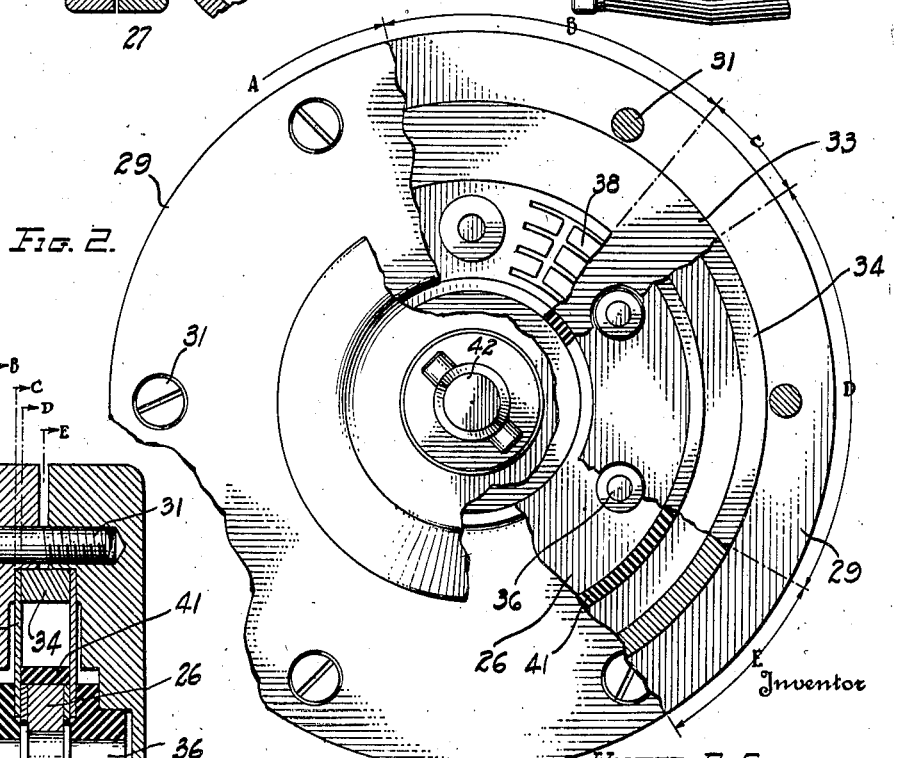
Fig. 3 is a detail section to a larger scale of a part of the vibration damper shown in Figs. 1 and 2.

The flange 26 is provided with a circular row of axially disposed pins 36, which are preferably permanently secured thereto by upsetting flanges thereon as clearly shown in Figs. 1 and 3. The oppositely disposed ends of the pins 36 project into circular recesses 37 formed in the web portions 29 of the inertia member 27. Disposed around the hub 23 on either side of the flange 26, and in contact with the plates 33 is an annular ring 38 of elastically deformable material such as rubber, or any other suitable material which is subjected to a considerable hysteresis loss when put through a cycle of compression and expansion. This rubber member 38 constitutes the hysteresis damping member of this invention. It is provided at spaced intervals with circular projections or knobs 39, which are adapted to surround and tightly embrace the pins 36, and to project into the recesses 37. These members 38 are preferably permanently secured to the friction plates 33, the pins 36, the flange 26 and the hub member 23, as by being vulcanized thereto, but are not secured in any way to the inertia members 27 except by being compressed therebetween.

It will be evident that upon relative movement between the inertia member 27 and the shaft with its hub member 23, that a part of the rubber members, and more especially the knobs 39 thereof, will be forced to partake of the movement of the shaft through the flange 26 and the pins 36, while other portions of these rubber members will be compelled to move with the inertia member through the recesses or depressions 37. Thus it is clear that these rubber members will be considerably distorted, causing a considerable loss of energy by hysteresis or internal friction, with resulting damping.

The rubber members 38 with their lugs 39 also serve other purposes. Being possessed of considerable resilience they continuously exert a pressure tending to return the inertia member 27 to its neutral position with respect to the hub 23, thus acting to restore the device to its original condition after any displacement thereof caused by vibration.

Also, since the friction disks 32 and their cooperating friction surfaces are completely enclosed within the elastic members 38, these surfaces are thoroughly protected from moisture, dirt, oil and other foreign matter affecting their friction values. To complete the enclosure of the friction surfaces, an additional peripheral strip or cover rubber 41 may be vulcanized between the plates 33. Because of this protection, the friction, and accordingly the damping effect at any particular engine speed remains substantially constant, being unaffected by conditions extraneous to the damper.

It will be observed that the damper hub and its flange and pins, the plates 33, the friction disks 32, and the rubber elements, may be conveniently permanently secured into an assembled unit, the parts being retained in position by reason of the rubber which forms the cover. This unit can be easily replaced in the event of wear or accidental damage, it being only necessary to secure an installation to clamp the unit in place between the halves of the inertia member, and secure these upon the end of the shaft in any convenient way, as by a nut 42. The friction disks 32 are thus permitted to float in frictional engagement with and between the cooperating flange and the friction plates, while completely enclosed in the rubber damping member 38.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. A vibration damper for shafts having a hub member secured thereon, an inertia member movable relatively to said hub member in response to shaft vibration, a friction plate secured to said inertia member, a friction device associated with said plate and said hub member and acting between the latter to develop friction in response to relative movement thereof, and elastically deformable means forming a covering for said friction device and disposed between the inertia member and the hub.

2. A vibration damper for shafts having a hub member provided with a radially disposed flange, an inertia member surrounding said hub member and having web portions axially spaced from the flange, a pair of friction plates carried by the inertia member and disposed on either side of said flange, a floating friction disk between each plate and said flange, and rubber damping means deformably mounted between the flange and the inertia member and forming a covering for said friction disk.

3. A vibration damper for shafts having a hub member provided with a radially disposed flange, a two-part inertia member having rim portions surrounding the hub member and axially spaced web portions on either side of said flange, axially projecting pins carried by said flange, spaced friction plates clamped between the rim portions and having openings to provide clearance for said pins, friction devices between the flanges and said friction plates, and rubber damping members between the pins and said web portions forming a covering for said friction devices.

4. A vibration damper for shafts having a hub members provided with a radial flange, a two-part inertia member having a part disposed on either side of said flange, friction plates clamped to and between said parts of the inertia member, friction disks disposed between and in engagement with the plates and the flange, and rubber means secured to and covering said plates, disks and flange, and having parts engaging said inertia member.

5. A vibration damper for shafts having a hub member provided with a radial flange, axially disposed pins secured to said flange, a two-part inertia member having a part disposed on each side of said flange, each part having holes into which said pins project, friction elements clamped between said inertia member parts, friction devices operatively mounted between said elements and the flange, and rubber means adapted to cover said friction devices and elements and having knob portions projecting into said holes around said pins.

6. A vibration damper for shafts having a member secured to the shaft, an inertia member movable with respect to the shaft, friction elements secured to the inertia member for movement therewith, friction devices arranged to float in frictional engagement with and between the shaft member and said friction elements, and a resilient covering means for said elements and devices, said means being adapted for distortion upon relative movement between the inertia member and the shaft.

7. A vibration damper for shafts comprising a shaft assembly including a hub having a radial flange, axially spaced radial plates on either side of the flange, a friction disk between and in frictional engagement with the flange and each plate, and rubber means covering said flange, disks and part of said plates, together with a two-part inertia member, and means for removably clamping the exposed parts of said plates between the parts of said inertia member.

8. A vibration damper for shafts comprising a shaft assembly including a hub having a radial flange, axially spaced radial plates on either side of the flange, disks in frictional contact with the flange and each plate, and deformable cover means for the parts and members of the assembly which have friction surfaces, together with a spacing ring between the peripheral portions of the plates, and means including an inertia member for clamping the plates upon said ring and operatively engaging said deformable cover.

9. In a vibration damper for a rotatable shaft, the combination with an inertia member movable relatively to the shaft, of means including elastically deformable means interposed between said inertia member and said shaft and serving to resist relative movement thereof, means whereby said deformable means is subjected both to shear and compression stresses on relative movement of said inertia member and shaft, and means substantially surrounded by said deformable means and associated with said shaft and inertia member for frictionally retarding relative movement of the latter.

10. In a vibration damper for a rotatable shaft, the combination with an inertia member movable relatively to the shaft, of means including an elastically deformable element connecting said inertia member and said shaft for rotation while permitting slight relative movement thereof, said element being operatively connected to said member and said shaft at points spaced axially of said shaft, whereby relative movement of the member and shaft will apply shearing stress to said element, and being interposed between portions of said member and shaft adjacent as regards the shaft axis, whereby relative movement of the member and shaft will apply compressive stress to said element and means partly covered by said deformable element and associated with said shaft and inertia member for frictionally retarding relative movement of the latter.

In testimony whereof I affix my signature.

WALTER R. GRISWOLD.